United States Patent
Gonthier et al.

(10) Patent No.: US 10,483,869 B1
(45) Date of Patent: Nov. 19, 2019

(54) POWER CONVERSION CIRCUIT HAVING INRUSH CURRENT LIMITING RESISTOR BYPASS

(71) Applicant: STMICROELECTRONICS LTD, Kowloon (HK)

(72) Inventors: Laurent Gonthier, Taipei (TW); Kimi Lu, Taichung (TW); Jack Wang, New Taipei (TW)

(73) Assignee: STMICROELECTRONICS LTD, Kowloon (HK)

( * ) Notice: Subject to any disclaimer, the term of this patent is extended or adjusted under 35 U.S.C. 154(b) by 0 days.

(21) Appl. No.: 16/035,069

(22) Filed: Jul. 13, 2018

(51) Int. Cl.
| | |
|---|---|
| H02M 7/162 | (2006.01) |
| H02M 7/06 | (2006.01) |
| H02M 1/32 | (2007.01) |
| G05F 1/573 | (2006.01) |
| H02M 7/12 | (2006.01) |
| H02M 1/42 | (2007.01) |

(52) U.S. Cl.
CPC ........... *H02M 7/1623* (2013.01); *H02M 1/32* (2013.01); *H02M 7/06* (2013.01); *G05F 1/573* (2013.01); *H02M 1/4225* (2013.01); *H02M 7/125* (2013.01)

(58) Field of Classification Search
CPC ...... H02M 1/4225; H02M 7/125; G05F 1/573
USPC ............... 323/312, 908; 363/65, 67, 78, 124
See application file for complete search history.

(56) References Cited

U.S. PATENT DOCUMENTS

| | | | |
|---|---|---|---|
| 5,032,968 A | 7/1991 | Mikami et al. | |
| 5,715,154 A | 2/1998 | Rault | |
| 6,018,473 A * | 1/2000 | Claassen | H02H 9/001 323/901 |
| 6,163,469 A * | 12/2000 | Yuki | H02H 9/001 323/908 |
| 6,426,885 B1 * | 7/2002 | Sekiguchi | H02H 9/001 318/434 |
| 6,493,245 B1 | 12/2002 | Phadke | |
| 6,737,845 B2 * | 5/2004 | Hwang | H02M 1/0845 323/222 |
| 7,084,692 B2 | 8/2006 | Peron | |
| 8,779,710 B2 * | 7/2014 | Ichihara | H02P 1/04 318/400.3 |
| 8,915,094 B2 * | 12/2014 | Yoo | F25D 29/006 62/228.1 |

(Continued)

FOREIGN PATENT DOCUMENTS

JP 62-135269 A 6/1987

*Primary Examiner* — Gary A Nash
(74) *Attorney, Agent, or Firm* — Seed Intellectual Property Law Group LLP

(57) ABSTRACT

Embodiments are directed to power conversion circuits including a bypass circuit for bypassing an inrush current limiting resistor. In one embodiment, a power conversion circuit is provided that includes a bridge rectifier, a current limiting resistor, a controllable current switching device, and a driver. The current limiting resistor has a first terminal coupled to an output terminal of the bridge rectifier and a second terminal coupled to an electrical ground. The controllable current switching device has conduction terminals coupled in parallel with respect to the current limiting resistor. The driver is coupled between the first terminal of the current limiting resistor and a control terminal of the current switching device, and the driver controls an operation of the current switching device based on a current through the current limiting resistor.

21 Claims, 4 Drawing Sheets

(56) References Cited

U.S. PATENT DOCUMENTS

| | | |
|---|---|---|
| 9,525,361 B2 | 12/2016 | Gonthier |
| 9,680,389 B2 * | 6/2017 | Ichihara ................ H02M 5/458 |
| 9,774,243 B2 * | 9/2017 | Gonthier ................ H02M 1/36 |
| 2012/0155138 A1 * | 6/2012 | Gonthier ................ H02H 9/001 363/126 |

* cited by examiner

US 10,483,869 B1

POWER CONVERSION CIRCUIT HAVING INRUSH CURRENT LIMITING RESISTOR BYPASS

BACKGROUND

Technical Field

The present disclosure is generally directed to power conversion circuits, devices, and methods, and more particularly, to power conversion circuits, devices, and methods including a controllable current switching device that is operable to bypass an inrush current limiting resistor during steady-state operation.

Description of the Related Art

Power conversion circuits are used, for example, as power converters that transform electrical energy from one form (e.g., AC) to another (e.g., DC) and that control the flow of the electrical energy from a source to a load. Such power conversion circuits are used in a wide variety of current products, including, for example, power adapters, computer switched-mode power supplies, lighting drivers, motor control applications, and many more.

In order to limit inrush currents, which are typically encountered by the power conversion circuit during a starting phase, some power conversion circuits include an inrush current limiting resistor. The inrush current limiting resistor can be a negative temperature coefficient (NTC) resistor, which has a resistance or impedance that decreases as temperature increases. Accordingly, during startup of the power conversion circuit, the temperature of the resistor is relatively low, and the resistance is therefore high, which helps to limit the inrush current through the NTC resistor. As the NTC resistor heats up due to the current flow, the resistance begins to decrease, and the NTC resistor therefore allows higher current to pass during normal or steady-state operation. However, even during steady-state there are losses due to the resistance of the NTC resistor, and the losses may be in a range of about 0.3 W to about 1 W.

BRIEF SUMMARY

The present disclosure is generally directed to power conversion circuits, devices, and methods in which a bypass circuit is included to bypass an inrush current limiting resistor during steady-state operation. The bypass circuit includes one or more controllable current switching devices that are coupled in parallel with respect to the inrush current limiting resistor, and which can be operated to bypass the inrush current limiting resistor in the steady-state operation. Driver circuits are provided for driving the controllable current switching devices based on a sensed voltage or current associated with the inrush current.

In one embodiment, the present disclosure provides a power conversion circuit that includes a bridge rectifier, a current limiting resistor, a controllable current switching device, and a driver. The bridge rectifier has first and second input terminals that receive an AC voltage, and first and second output terminals that output a rectified voltage. The current limiting resistor has a first terminal coupled to the second output terminal of the bridge rectifier and a second terminal coupled to an electrical ground. The controllable current switching device has a first terminal coupled to the first terminal of the current limiting resistor, and the second terminal coupled to the second terminal of the current limiting resistor. The driver is coupled between the first terminal of the current limiting resistor and a third terminal (e.g., a control terminal) of the current switching device, and the driver controls an operation of the current switching device based on a current through the current limiting resistor.

In another embodiment, the present disclosure provides a device that includes a bridge rectifier, first and second current limiting resistors, and first and second silicon controlled rectifiers (SCRs). The bridge rectifier includes first and second input nodes, first and second output nodes, a first diode coupled between the first input node and the first output node, a second diode coupled between the second input node and the first output node, a third diode coupled between the first input node and the second output node, and a fourth diode coupled between the second input node and the second output node. The first current limiting resistor is coupled between the third diode and the second output node, and the second current limiting resistor is coupled between the fourth diode and the second output node. The first silicon controlled rectifier is coupled between the first input node and the second output node, and the first silicon controlled rectifier has a first control terminal. The second silicon controlled rectifier is coupled between the second input node and the second output node, and the second silicon controlled rectifier has a second control terminal.

In yet another embodiment, the present disclosure provides a method of manufacturing a power conversion circuit that includes a bridge rectifier having first and second input terminals and first and second output terminals. The method includes: coupling a current limiting resistor between the second output terminal and an electrical ground; coupling first and second terminals of a controllable current switching device across the current limiting resistor; and electrically coupling a driver between the first terminal of the current limiting resistor and the third terminal of the current switching device, the driver configured to control an operation of the current switching device based on a voltage across the current limiting resistor.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements are arbitrarily enlarged and positioned to improve drawing legibility. Further, the particular shapes of the elements as drawn are not necessarily intended to convey any information regarding the actual shape of the particular elements, and have been solely selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with portable electronic devices and head-worn devices, have not been shown or described in detail to avoid unnecessarily obscuring descriptions of the embodiments.

Throughout the specification and claims which follow, the word "comprise" and variations thereof, such as, "comprises" and "comprising" are to be construed in an open, inclusive sense, that is, as "including, but not limited to."

Reference throughout this specification to "one embodiment" or "an embodiment" means that a particular feature, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its broadest sense, that is, as meaning "and/or" unless the content clearly dictates otherwise.

The headings and Abstract of the Disclosure provided herein are for convenience only and do not interpret the scope or meaning of the embodiments.

Figure 1:
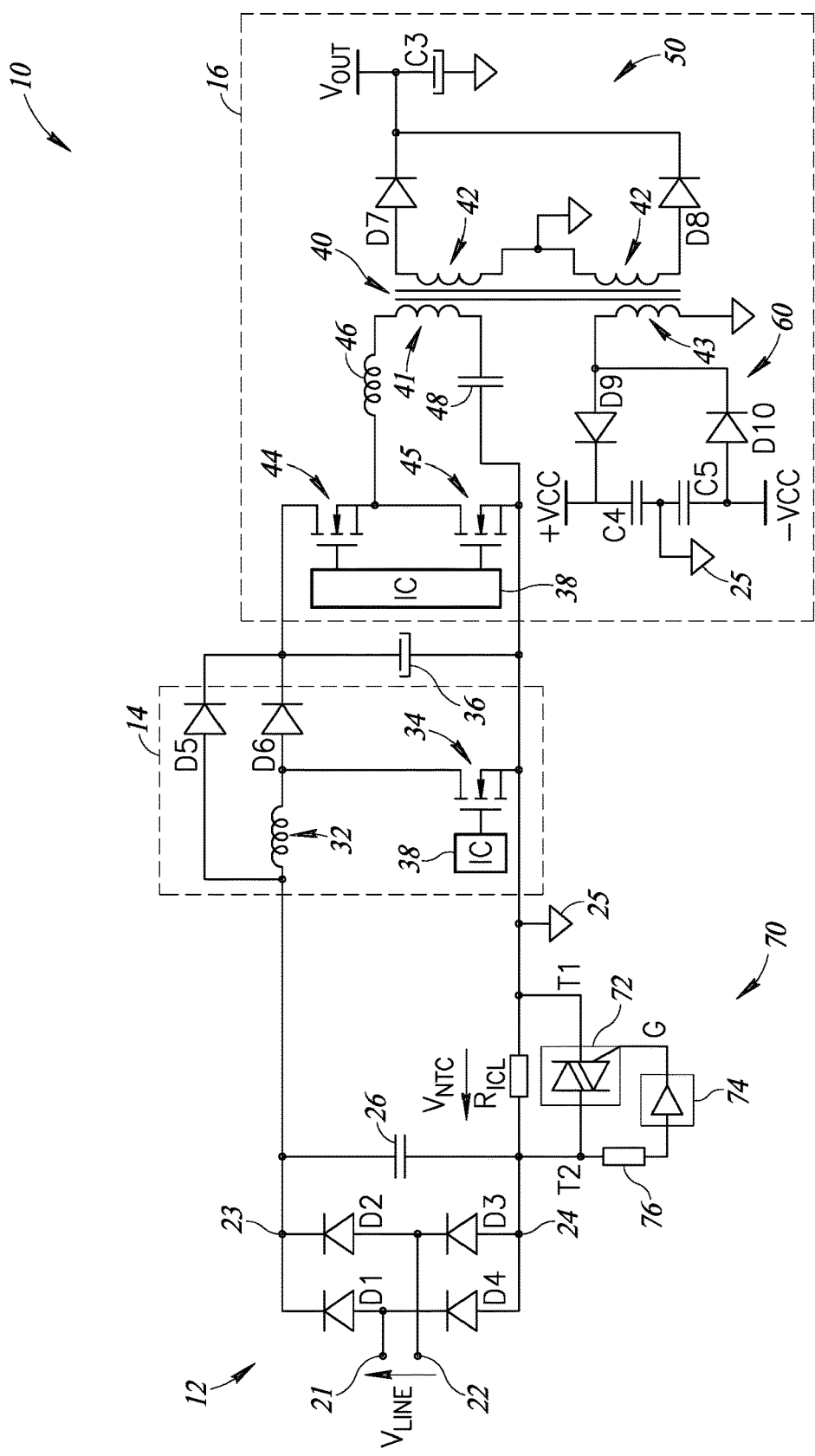
FIG. 1 is a circuit diagram illustrating a power conversion circuit, in accordance with one or more embodiments.

Turning now to FIG. 1, illustrated therein is a circuit diagram illustrating a power conversion circuit 10, in accordance with one or more embodiments of the present disclosure.

The power conversion circuit 10 includes a bridge rectifier 12, a power factor correction circuit (PFC) 14, and a DC/DC converter 16, which may be any DC/DC converter including a transformer, including, for example, LLC, LCC, Flyback, and Forward converters. As shown in FIG. 1, the DC/DC converter is an LLC converter 16; however, embodiments provided herein are not limited thereto. The bridge rectifier 12 includes first and second input terminals 21, 22 that receive an AC voltage $V_{LINE}$. Diodes D1-D4 are arranged in a known manner in the bridge rectifier 12 and convert the received AC voltage $V_{LINE}$ to a rectified voltage, which is output by the bridge rectifier 12 at first and second output terminals 23, 24.

The power factor correction circuit 14 is electrically coupled between the bridge rectifier 12 and the LLC converter 16. More particularly, the power factor correction circuit 14 has a first input coupled to the first output terminal 23 of the bridge rectifier 12, and a second input coupled to an electrical ground 25.

The power factor correction circuit 14 includes diodes D5, D6, an inductor 32, and a switch 34. The diodes D5, D6, inductor 32, and switch 34 may be arranged in a known manner to implement the power factor correction circuit 14. The operation of the switch 34 may be controlled by a controller 38, which may be, for example, an integrated circuit. It is noted that the diode D5 may be an optional diode, and may be omitted in various implementations of the power factor correction circuit 14.

A first capacitor 26 may be coupled between the first and second outputs 23, 24 of the bridge rectifier 12. The first capacitor 26 may be, for example, a filter capacitor. The first capacitor 26 may have a capacitance value less than 1 μF, and in some embodiments, the filter capacitor 26 may have a capacitance of about 470 nF.

A second capacitor 36 may be coupled in parallel between the power factor correction circuit 14 and the LLC converter 16.

The LLC converter 16 may be any converter including a transformer, such as a switched mode power supply, that includes circuitry for transferring power from the power factor correction circuit 14 to one or more DC loads while converting voltage and current characteristics.

The converter 16 includes a transformer 40 having a primary winding 41 coupled to the power factor conversion circuit 14 via switches 44, 45, an inductor 46, and a capacitor 48. The switches 44, 45 may be controlled by a controller 38, which may be the same controller 38 that controls the switch 34 in the power factor conversion circuit 14, or may be a different controller. The controller 38 may be implemented by an integrated circuit.

The LLC converter 16 further includes an output supply voltage circuit 50. The output supply voltage circuit 50 includes secondary windings 42 of the transformer 40, which are magnetically coupled to the primary winding 41 and electrically coupled to diodes D7, D8 and an output capacitor C3, all of which function together to generate an output supply voltage $V_{OUT}$ based on the rectified voltage provided to the primary winding 41 from the power factor correction circuit 14. The output supply voltage $V_{OUT}$ may then be provided to one or more DC loads.

The switches included in the power factor correction circuit 14 and the LLC converter may be any suitable switches, including, for example, transistors such as bipolar junction transistors, MOSFET transistors, or the like.

The components of the LLC converter 16 described above may be included in a conventional LLC converter, and their operation may be known to those skilled in the art. However, unlike conventional LLC converters, the LLC converter 16 further includes a negative power supply generation circuit 60. The negative power supply generation circuit 60 includes an auxiliary winding 43 which is coupled to diodes D9, D10, and capacitors C4, C5 and which generates a positive supply voltage +VCC and a negative supply voltage −VCC. The positive supply voltage +VCC may be a same or different voltage as the output voltage $V_{OUT}$. The auxiliary winding 43, diode D9, and capacitor C4 may be included as components in a conventional LLC converter, for example, as circuitry for generating the positive supply voltage +VCC, which may be used for example, to provide power for operating the controller 38. However, in one or more embodiments of the present disclosure, the negative power supply generation circuit 60 is formed by adding the diode D10 and the capacitor C5 to the circuit, with each of the capacitors C4 and C5 being coupled to the electrical ground 25. This facilitates generation of the negative supply voltage −VCC, which is utilized by a bypass circuit to selectively bypass an inrush current limiting resistor $R_{ICL}$ as will be discussed in further detail below.

The inrush current limiting resistor $R_{ICL}$ is coupled between the second output terminal 24 of the bridge rectifier 12 and the electrical ground 25. The current limiting resistor $R_{ICL}$ may be, for example, a negative temperature coefficient (NTC) resistor, through which impedance decreases in response to an increase in temperature. The inrush current limiting resistor $R_{ICL}$ increases the input resistance of the power conversion circuit 10 and thereby limits or reduces the inrush current into or through the various components which may be susceptible to the effects of an inrush current, including, for example, the bridge rectifier 12, the capacitors 126 (see FIG. 2), 36, the switches 34, 44, 45, and any other components of the power conversion circuit 10.

The bypass circuit 70 is electrically coupled to the inrush current limiting resistor $R_{ICL}$ in parallel, and is operable to bypass the inrush current limiting resistor $R_{ICL}$, for example, in steady-state operation of the power conversion circuit 10 when there is no inrush current. The bypass circuit 70 includes a current switching device 72, a driver 74, and a resistor 76.

The current switching device 72 may be any controllable current switching device that is capable of selectively conducting current in one or two directions. For example, in some embodiments, the current switching device 71 may be a bidirectional current switching device such as a bidirectional triode thyristor or a TRIAC. In some embodiments, the current switching device 71 may be a unidirectional device, such as a unidirectional silicon controlled rectifier (SCR). As shown in FIG. 1, the current switching device 72 may be a TRIAC, which has first and second conduction terminals (T1, T2) coupled across the inrush current limiting resistor $R_{ICL}$, and a control terminal (G) is coupled to an output of the driver 74. The first conduction terminal (T1) is further coupled to the electrical ground 25.

In operation, the driver 74 controls the operation of the current switching device 72 based on the current through the inrush current limiting resistor $R_{ICL}$. That is, when an inrush current, i.e., a current corresponding to the voltage $V_{NTC}$ across the inrush current limiting resistor $R_{ICL}$, flows through inrush current limiting resistor $R_{ICL}$, the driver 74 compares a voltage associated with the inrush current with a reference voltage, and bypasses the inrush current limiting resistor $R_{ICL}$ by turning on the current switching device 72 if the voltage associated with the inrush current is higher in magnitude (e.g., more negative) than the reference voltage, e.g., during steady-state operation. The voltage across the inrush current limiting resistor $R_{ICL}$ is negative, so the current switching device 72 is turned on to bypass the inrush current limiting resistor $R_{ICL}$ when the absolute value, or magnitude, of the voltage across the inrush current limiting resistor $R_{ICL}$ is greater than the absolute value of the reference voltage. This will be described in further detail below with respect to FIG. 3.

Figure 3:
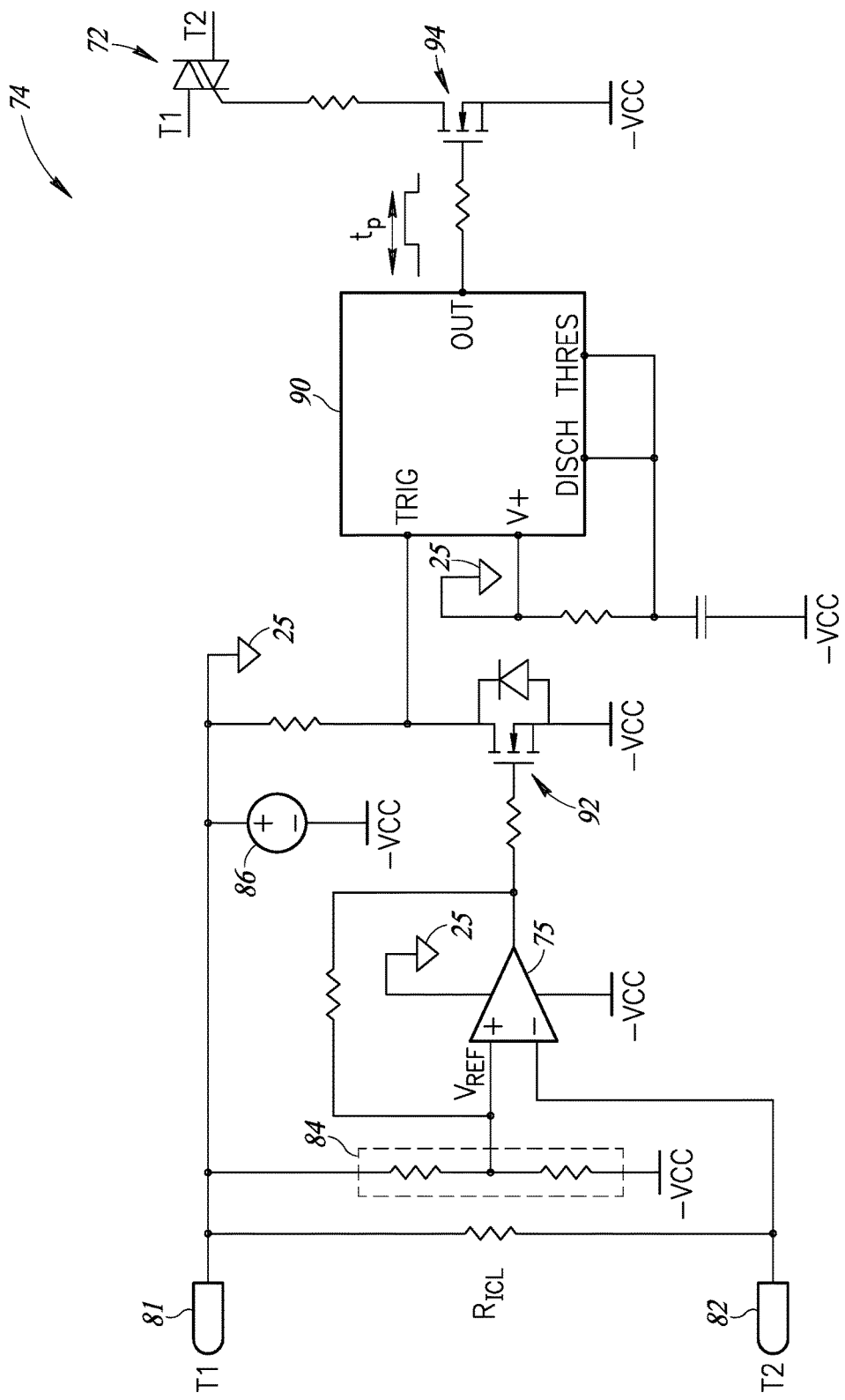
FIG. 3 is a circuit diagram illustrating a driver which may be included in a power conversion circuit, in accordance with one or more embodiments.

FIG. 3 is a circuit diagram illustrating further details of the driver 74, in accordance with one or more embodiments of the present disclosure. As shown in FIG. 3, the driver 74 has a first input terminal 81 coupled to the first conduction terminal (T1) of the current switching device 72, and a second input terminal 82 coupled to the second conduction terminal (T2) of the current switching device 72. The driver 74 is therefore coupled across the inrush current limiting resistor $R_{ICL}$ by the first and second input terminals 81, 82, which facilitates sensing of the voltage $V_{NTC}$ across the inrush current limiting resistor $R_{ICL}$. The second input terminal 82 is shown as being connected to the second conduction terminal (T2) of the current switching device 72; however, it will be readily understood that the second input terminal 82 may be coupled to the second conduction terminal (T2) through the resistor 76 (not shown in FIG. 3). The driver 74 may include a comparator 75 having a non-inverting terminal coupled to a reference voltage $V_{REF}$, and an inverting terminal coupled to second conduction terminal (T2), e.g., through the resistor 76.

The resistor 76 serves to limit the current applied to the input (e.g., the inverting input) of the comparator 75 (which may be an operational amplifier). In some embodiments, the resistor 76 may optionally be used with one or more additional resistors to form a voltage divider, which divides the voltage $V_{NTC}$ to a lesser voltage having a desired proportion with respect to the voltage $V_{NTC}$, which proportion may be selected as desired by using a resistor 76 having a suitable resistance.

The driver 74 further includes a first switch 92, a second switch 94, and a network of resistors having various resistance values. The values for the various resistors in the driver 74 may be selected as desired depending on design. The first and second switches 92, 94 may be, for example, NMOS transistors, although embodiments provided herein are not limited thereto.

In operation, the comparator 75 compares the voltage associated with the inrush current, i.e., the voltage received at the inverting input, with the reference voltage $V_{REF}$ and controls the first switch 92 based on the comparison. The reference voltage $V_{REF}$ may be generated, for example, by a voltage divider 84 which divides a voltage output from a voltage supply 86. The power supply 86 may be provided, for example, from the negative power supply generation circuit 60 shown in FIG. 1, with the electrical ground 25 being connected to the first conduction terminal (T1) of the current switching device 72.

In particular, if the voltage at the inverting input is greater (e.g., more negative) than the reference voltage $V_{REF}$ at the non-inverting input, then the comparator 75 outputs a signal to turn on the first switch 92, which causes the timer 90 to output a pulse ($t_p$) that turns on the second switch 94. The second switch 94 is coupled to the control terminal (G) of the current switching device 72, and the second switch 94 thus couples the negative power supply −VCC to the control terminal (G) as soon as the power conversion circuit 10 reaches a steady-state operational condition (e.g., with no inrush current through the resistor $R_{ICL}$), thereby bypassing the inrush current limiting resistor $R_{ICL}$ during steady-state operation. Both the negative power supply generation circuit 60 and the first conduction terminal (T1) of the current switching device 72 are referenced to the same electrical ground 25. This allows a negative current to be applied to the control terminal (G) of the current switching device 72 (e.g., a TRIAC) when the second switch 94 is turned on.

In some embodiments, the current switching device 72 may be a TRIAC configured to operate in Quadrant 3, which provides for better reliability of the bypass circuit 70. Further, in some embodiments, the current switching device may be a snubberless TRIAC, which are generally more robust with respect to di/dt and surge currents.

The output pulse ($t_p$) of the driver 74, which is applied to turn on the second switch 94, is sufficient to ensure latch-up of the current switching device 72, so that the switching device 72 remains in a conducting state during the steady-state operation of the power conversion circuit 10. In the conducting state, the current switching device 72 acts as a short circuit between the conduction terminals T1, T2, thereby bypassing the inrush current limiting resistor $R_{ICL}$, which reduces the power losses that would otherwise be present if the current limiting resistor $R_{ICL}$ is not bypassed. That is, the inrush current limiting resistor $R_{ICL}$ is shunted in steady-state operation, thereby reducing the power losses and resulting in increased efficiency.

During an in-rush condition, such as during turn on of the power conversion circuit 10, the −VCC voltage is not yet supplied by block 60. So the driver circuit 74 is not supplied and cannot operate and turn-on switch 72. Another way to ensure that switch 72 will not be spuriously tuned-on during inrush is to activate the timer 90 only after inrush (for example by connecting its RESET pin to the reference 25 or by controlling this RESET pin by a signal generated by the application controller unit). Then the second switch 94 remains off so that the current switching device 72 is off and the current limiting resistor $R_{ICL}$ is not bypassed during in-rush conditions.

The reference voltage $V_{REF}$ may be selected to be any suitable voltage which corresponds with a voltage, or a divided voltage, associated with an inrush current. That is, the reference voltage $V_{REF}$ may be selected so that the driver outputs the pulse to turn on the current switching device 72 and bypass the current limiting resistor $R_{ICL}$ only when an inrush current having particular current and/or voltage characteristics is not present, thereby indicating normal, steady-state operation of the power conversion circuit 10.

The resistance of the inrush current limiting resistor $R_{ICL}$ may be selected to have any suitable value, which may be selected in consideration of a desired or acceptable peak amplitude of the inrush current and the system start-up delay. As an example, the value for the resistance of the inrush current limiting resistor $R_{ICL}$ may be between about 10 ohms and 100 ohms; however, these values are merely examples, and other resistance values may be used for the inrush current limiting resistor $R_{ICL}$.

Figure 2:
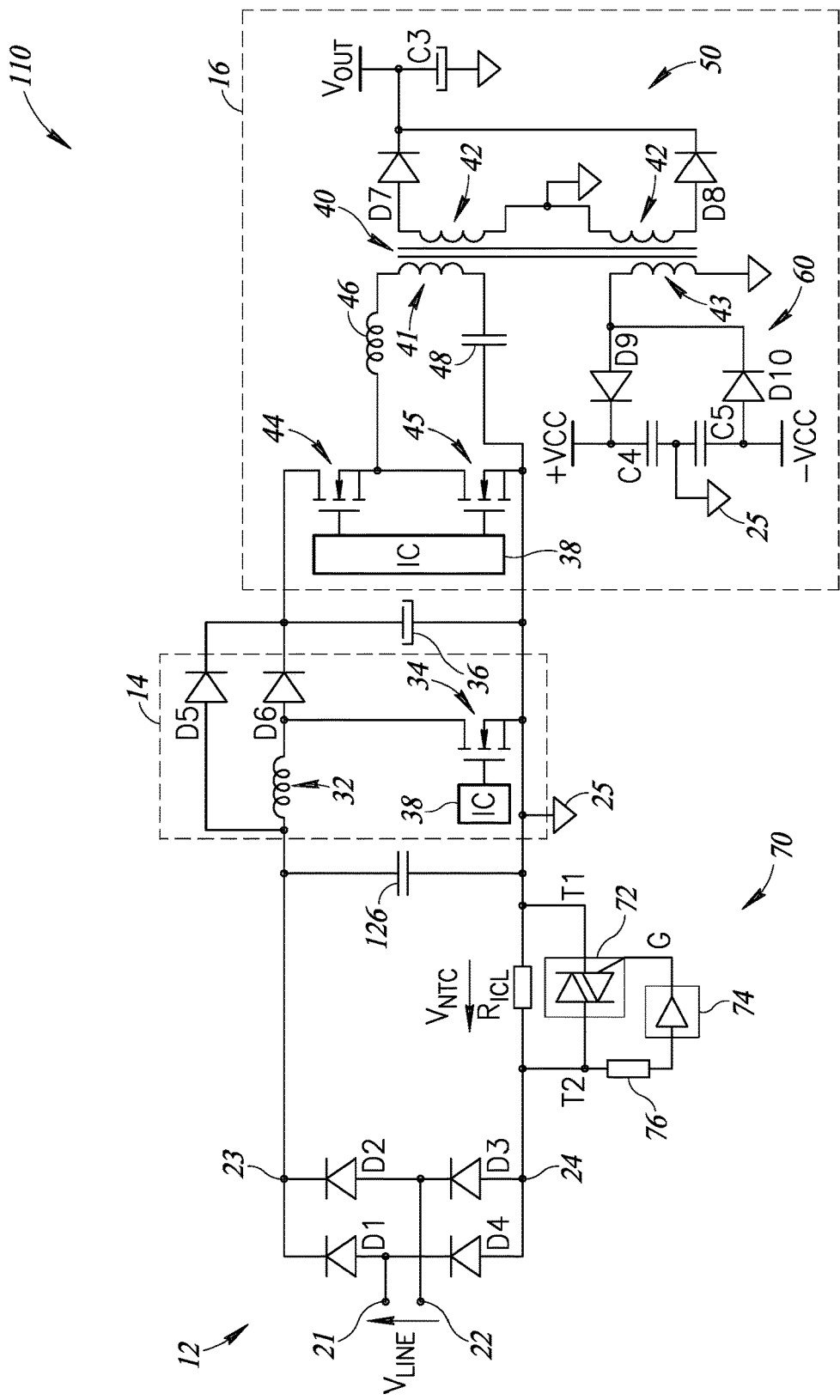
FIG. 2 is a circuit diagram illustrating another power conversion circuit, in accordance with one or more embodiments.

FIG. 2 is a circuit diagram illustrating a power conversion circuit 110, in accordance with one or more embodiments of the present disclosure. The power conversion circuit 110 is substantially the same as the power conversion circuit 10 shown in FIG. 1, except that the power conversion circuit 110 includes a first capacitor 126 coupled between the first output terminal 23 of the bridge rectifier 12 and the electrical ground 25. This is in contrast to the first capacitor 26 shown in FIG. 1, which is coupled between the first output terminal 23 of the bridge rectifier 12 and the inrush current limiting resistor $R_{ICL}$. The first capacitor may thus be electrically coupled to either side of the inrush current limiting resistor $R_{ICL}$, as shown in FIGS. 1 and 2. In some embodiments, the power conversion circuit 110 may include both capacitors, i.e., capacitor 26 (as shown in FIG. 1) and capacitor 126 (as shown in FIG. 2).

Figure 4:
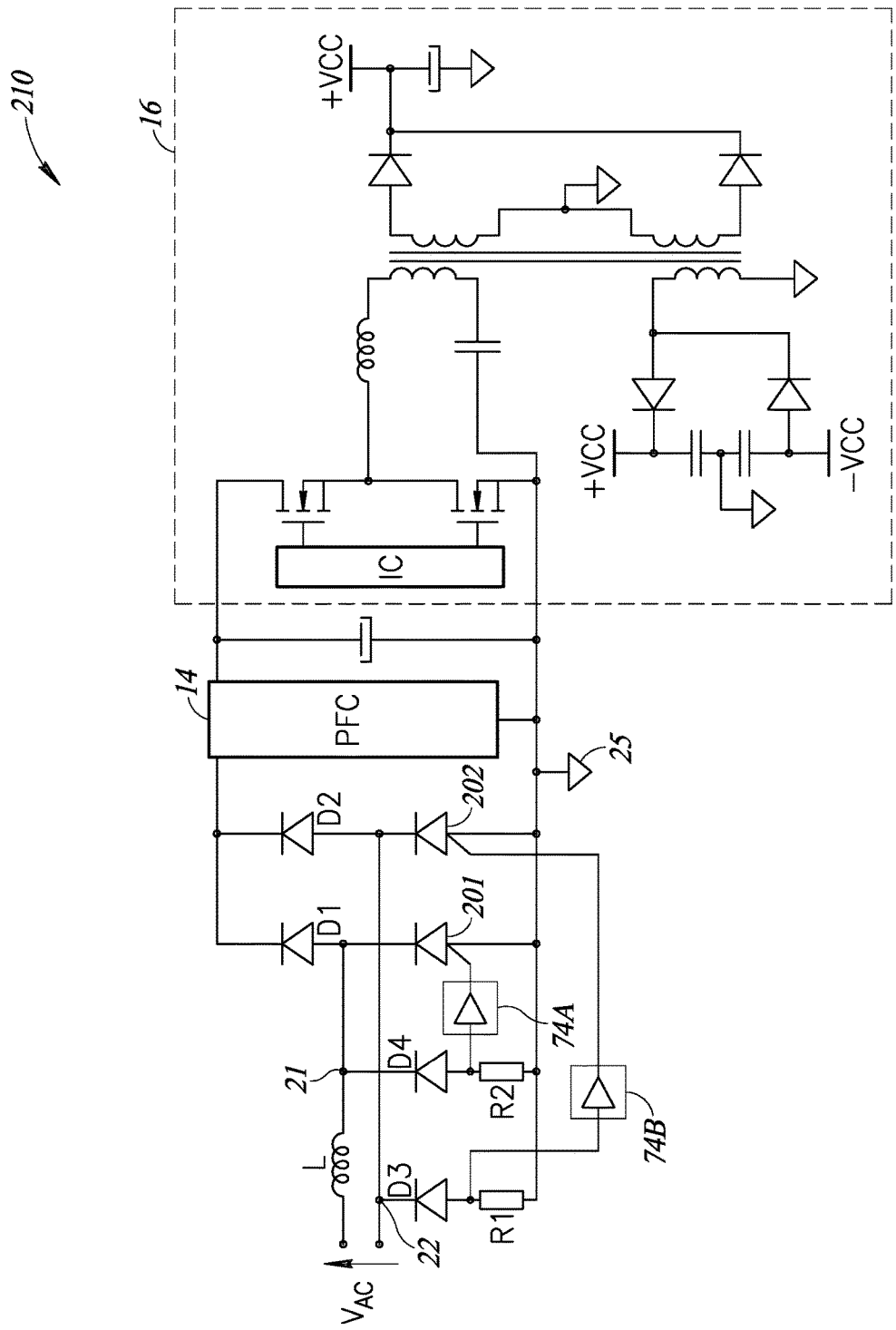
FIG. 4 is a circuit diagram illustrating yet another power conversion circuit, in accordance with one or more embodiments.

FIG. 4 is circuit diagram illustrating another power conversion circuit 210, in accordance with one or more embodiments of the present disclosure. The power conversion circuit 210 is similar to the power conversion circuit 10 shown in FIG. 1, except for the differences that will be discussed below.

The main difference between the power conversion circuit 210 and the power conversion circuit 10 shown in FIG. 1 is that the power conversion circuit 210 includes two inrush current limiting resistors R1, R2, respectively coupled between the third and fourth diodes D3, D4 and the electrical ground 25.

The power conversion circuit 210 further includes first and second silicon controlled rectifiers (SCRs) 201, 202, instead of the single current switching device 72, e.g., a TRIAC, of the power conversion circuit 10 shown in FIG. 1. The first and second SCRs 201, 202 may be anode-gate SCRs, which have a control or gate terminal positioned near the anode terminal of the SCR, in contrast to a conventional SCR which has the gate terminal near the cathode terminal.

The first SCR 201 has conduction terminals (e.g., anode and cathode terminals) coupled between the first input terminal 21 and the electrical ground 25. A first driver 74A has an input terminal coupled to a node between the fourth diode D4 and the second resistor R2, and an output terminal coupled to the gate terminal of the first SCR 201. Accordingly, when the first SCR 201 is turned on, e.g., by an output pulse from the first driver 74A, the fourth diode D4 and the second inrush current limiting resistor R2 are bypassed, and current flows through the first SCR 201.

Similarly, the second SCR 201 has conduction terminals coupled between the second input terminal 22 and the electrical ground 25. A second driver 74B has an input terminal coupled to a node between the third diode D3 and the first inrush current limiting resistor R1, and an output terminal coupled to the gate terminal of the second SCR 202. Accordingly, when the second SCR 202 is turned on, e.g., by an output pulse from the second driver 74B, the third diode D3 and the first inrush current limiting resistor R1 are bypassed, and current flows through the second SCR 202.

The first and second drivers 74A, 74B may have the same circuit construction, and may operate in a same manner, as the driver 74 shown in FIG. 3, and described with respect to the power conversion circuit 10 of FIG. 1. In particular, the first and second drivers 74A, 74B may control the operation of the first and second SCRs 201, 202, respectively, based on the currents through the inrush current limiting resistors R1, R2. The first and second drivers 74A, 74B control the first and second SCRs 201, 202 during respective half-cycles of the input voltage.

The first and second drivers 74A, 74B compare voltages associated with inrush currents through the first and second inrush current limiting resistors R1, R2, respectively, to the reference voltage $V_{REF}$, and turn on the first and second SCRs 201, 202, respectively, if the voltages are greater in absolute value than the reference voltage $V_{REF}$, thereby bypassing the inrush current limiting resistors R1, R2 during steady-state operation of the power conversion circuit 210, which results in reduced power losses and increased efficiency.

The inventors of the present disclosure have confirmed through experiments that the power conversion circuits including the bypass circuits provided herein achieve efficiency gains about 0.7% as compared to conventional power conversion circuits without such bypass circuits.

Additional advantages provided by the embodiments of the present disclosure will be appreciated to those skilled in the relevant art. One such advantage is that no added auxiliary windings are needed to implement the power conversion circuits provided herein. Instead, as noted above, the bypass circuit of the power conversion circuits can be implemented using an existing auxiliary winding of the LLC converter.

Further, the embodiments provided herein do not rely on AC voltage sensing to control the SCR or TRIAC. Accordingly, the power conversion circuits provided herein can work with any discontinuous conduction mode (DCM) PFC controller, without using an AC sensor.

Moreover, the embodiments provided herein allow for suppressing the losses through the inrush current limiting resistor, such as an NTC resistor, which losses otherwise may be within a range of about 0.3 W to 1 W.

Additionally, since the inrush current limiting resistor is positioned between the bridge rectifier and the power factor converter, it reduces the risk of failure of the switching device (e.g., MOS transistor) in the PFC due to overvoltage in a case where a voltage surge is experienced.

The power conversion circuits provided herein are operable with both DCM and continuous conduction mode (CCM) power factor correction circuits.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A power conversion circuit, comprising:
   a bridge rectifier, including:
      first and second input terminals configured to receive an AC voltage, and
      first and second output terminals configured to output a rectified voltage;
   a current limiting resistor having a first terminal coupled to the second output terminal of the bridge rectifier and a second terminal coupled to an electrical ground;
   a controllable current switching device having a first terminal, a second terminal, and a third terminal, the first terminal coupled to the first terminal of the current limiting resistor, and the second terminal coupled to the second terminal of the current limiting resistor; and
   a driver coupled between the first terminal of the current limiting resistor and the third terminal of the current switching device, the driver configured to selectively couple the third terminal of the current switching device to a negative power supply based on a current through the current limiting resistor.

2. The power conversion circuit of claim 1 wherein the controllable current switching device comprises at least one of: a silicon controlled rectifier and a TRIAC.

3. The power conversion circuit of claim 2 wherein the controllable current switching device is a TRIAC configured to operate in quadrant 3.

4. The power conversion circuit of claim 1 further comprising a capacitor coupled between the first and second output terminals of the bridge rectifier.

5. The power conversion circuit of claim 4 further comprising a second capacitor having a first electrode coupled to the first output terminal of the bridge rectifier and a second electrode coupled to the second terminal of the current limiting resistor.

6. The power conversion circuit of claim 1 further comprising a capacitor having a first electrode coupled to the first output terminal of the bridge rectifier and a second electrode coupled to the second terminal of the current limiting resistor.

7. The power conversion circuit of claim 1 wherein the current limiting resistor is a negative temperature coefficient resistor.

8. A power conversion circuit, comprising:
   a bridge rectifier, including:
      first and second input terminals configured to receive an AC voltage, and
      first and second output terminals configured to output a rectified voltage;
   a current limiting resistor having a first terminal coupled to the second output terminal of the bridge rectifier and a second terminal coupled to an electrical ground;
   a controllable current switching device having a first terminal, a second terminal, and a third terminal, the first terminal coupled to the first terminal of the current limiting resistor, and the second terminal coupled to the second terminal of the current limiting resistor; and
   a driver coupled between the first terminal of the current limiting resistor and the third terminal of the current switching device, the driver configured to control an operation of the current switching device based on a current through the current limiting resistor,
   wherein the driver includes:
      a comparator having a first input terminal coupled to the first terminal of the current limiting resistor and a second input terminal coupled to a reference voltage, the comparator configured to turn on the current switching device in response to a voltage at the first input terminal being greater in magnitude than the reference voltage.

9. The power conversion circuit of claim 8 wherein the driver is configured to turn on the current switching device by coupling the third terminal of the current switching device to a negative power supply in response to the voltage at the first input terminal being greater than the reference voltage as soon as the negative supply is powered.

10. The power conversion circuit of claim 8, further comprising:
   a power factor correction circuit; and
   a converter including a transformer, the converter coupled to the power factor correction circuit, the power factor correction circuit electrically coupled between the converter and the bridge rectifier, the converter including:
      a primary winding coupled to the power factor correction circuit;
      a secondary winding having a first terminal;
      a first diode coupled between a negative supply voltage and the first terminal of the secondary winding; and
      a first capacitor coupled between the negative supply voltage and the electrical ground.

11. The power conversion circuit of claim 10 wherein the converter further includes:
   a second diode coupled between a positive supply voltage and the secondary winding; and
   a second capacitor coupled between the positive supply voltage and the electrical ground.

12. A device, comprising:
   a bridge rectifier, including:
      first and second input nodes,
      first and second output nodes,
      a first diode coupled between the first input node and the first output node,
      a second diode coupled between the second input node and the first output node,
      a third diode coupled between the first input node and the second output node, and
      a fourth diode coupled between the second input node and the second output node;
   a first current limiting resistor coupled between the third diode and the second output node;
   a second current limiting resistor coupled between the fourth diode and the second output node;
   a first silicon controlled rectifier coupled between the first input node and the second output node, the first silicon controlled rectifier having a first control terminal; and
   a second silicon controlled rectifier coupled between the second input node and the second output node, the second silicon controlled rectifier having a second control terminal.

13. The device of claim 12, further comprising:
   a first driver coupled between the first current limiting resistor and the first control terminal of the first silicon controlled rectifier, the first driver configured to control the first silicon controlled rectifier based on a current through the first current limiting resistor; and
   a second driver coupled between the second current limiting resistor and the second control terminal of the second silicon controlled rectifier, the second driver configured to control the second silicon controlled rectifier based on a current through the second current limiting resistor.

14. The device of claim 13 wherein the second output node is an electrical ground.

15. The device of claim 14 wherein the first driver includes a first comparator having a first input terminal coupled to the first current limiting resistor and a second input terminal coupled to a reference voltage, the first comparator configured to turn on the first silicon controlled rectifier in response to a voltage at the first input terminal being higher than the reference voltage, and
  wherein the second driver includes a second comparator having a first input terminal coupled to the second current limiting resistor and a second input terminal coupled to the reference voltage, the second comparator configured to turn on the second silicon controlled rectifier in response to a voltage at the first input terminal of the second comparator being higher in absolute magnitude than the reference voltage.

16. The device of claim 15 wherein the first and second drivers are configured to turn on the first and second silicon controlled rectifiers, respectively, by coupling the respective first and second control terminals to a negative power supply.

17. The device of claim 15, further comprising:
  a power factor correction circuit; and
  a converter coupled to the power factor correction circuit, the power factor correction circuit electrically coupled between the converter and the bridge rectifier, the converter configured to generate the negative supply voltage referenced to the electrical ground.

18. The device of claim 17 wherein the converter includes:
  a primary winding coupled to the power factor correction circuit;
  a secondary winding having a first terminal;
  a first diode coupled between a negative supply voltage and the first terminal of the secondary winding; and
  a first capacitor coupled between the negative supply voltage and the electrical ground.

19. The device of claim 12 wherein the first and second silicon controlled rectifiers are anode-gate silicon controlled rectifiers.

20. A method of manufacturing a power conversion circuit, the power conversion circuit including a bridge rectifier having first and second input terminals and first and second output terminals, the method comprising:
  coupling a current limiting resistor between the second output terminal and an electrical ground;
  coupling first and second terminals of a controllable current switching device across the current limiting resistor;
  electrically coupling a driver between a first terminal of the current limiting resistor and the third terminal of the current switching device, the driver configured to control an operation of the current switching device based on a voltage across the current limiting resistor; and
  electrically coupling, by the driver, the third terminal of the current switching device to a negative power supply based on a current through the current limiting resistor.

21. The method of claim 20 wherein electrically coupling the driver between the first terminal of the current limiting resistor and the third terminal of the current switching device includes:
  electrically coupling the first terminal of the current limiting resistor to an inverting input of a comparator; and
  electrically coupling a reference voltage to a non-inverting input of the comparator.

* * * * *